United States Patent [19]
Benda

[11] Patent Number: 5,265,108
[45] Date of Patent: Nov. 23, 1993

[54] OUTPUT PHASE SHIFTER FOR COUPLED MULTIPLE-OUTPUT RING LASERS

[75] Inventor: John A. Benda, Amston, Conn.

[73] Assignee: United Technologies Corporation, Hartford, Conn.

[21] Appl. No.: 949,951

[22] Filed: Sep. 24, 1992

[51] Int. Cl.[5] ............................................. H01S 3/098
[52] U.S. Cl. ...................................... 372/18; 372/94; 372/108; 372/97
[58] Field of Search ....................... 372/18, 94, 93, 97, 372/108

[56] References Cited

U.S. PATENT DOCUMENTS

| | | | |
|---|---|---|---|
| 3,628,182 | 12/1971 | Rumson et al. | 331/96 |
| 3,697,181 | 10/1972 | Macek et al. | 356/106 |
| 4,393,503 | 7/1983 | Angelbeck et al. | 372/20 |
| 4,485,473 | 11/1984 | Tang et al. | 372/18 |
| 4,682,339 | 7/1987 | Sziklas et al. | 372/95 |
| 4,841,541 | 6/1989 | Sziklas et al. | 372/94 |

Primary Examiner—Leon Scott, Jr.
Attorney, Agent, or Firm—Gerald L. DePardo

[57] ABSTRACT

A coupled multiple output ring laser system having a plurality of ring lasers 100,200 that are coupled together, each ring laser having separate output beams 159,280 and separate suppressor mirrors 228,282, is provided with two optical trombones 250,252 mounted on a common phase shifter 268, which changes the optical path length to the suppressor mirror 228 in the laser 100 and changes the optical path length of the mutual coupling path between the laser 100 and the laser 200 in an equal and opposite direction, thereby changing the phase of the output beam 159 of the laser 100 with respect to the output beam of the laser 200, without changing the phase of the output beam 280 from the laser 200. The invention works for any number of lasers and works equally well with reverse-to-forward coupling or forward-to-reverse coupling schemes.

12 Claims, 3 Drawing Sheets

OUTPUT PHASE SHIFTER FOR COUPLED MULTIPLE-OUTPUT RING LASERS

STATEMENT AS TO RIGHTS TO INVENTIONS MADE UNDER FEDERALLY SPONSORED RESEARCH AND DEVELOPMENT

The U.S. government has a paid-up license in this invention and the right in limited circumstances to require the patent owner to license others on reasonable terms as provided for by the terms of contract No. F29601-85-C-0127 awarded by the Air Force Weapons Laboratory (AFWL; or Department of the Air Force, Phillips Laboratory, Kirtland Air Force Base).

TECHNICAL FIELD

This invention relates to lasers, and more particularly to the phase shifting of output beams from coupled ring lasers.

BACKGROUND ART

Ring lasers (i.e., lasers where the internal light never propagates back on itself), as is known, provide a higher extraction efficiency (i.e., power output of the laser compared to power available in the gain medium), from the gain medium than typical standing wave (linear) resonators or coupled standing wave resonators (i.e., lasers where the internal light propagates back on itself).

It is also known in the art of ring lasers that two or more ring lasers or resonators may be coupled together (i.e., phase-locked, or having a constant phase difference between beams) by a technique such as that described in U.S. Pat. No. 4,841,541 to Sziklas et al., entitled "Coupling of Ring Lasers". The patent discusses two coupling embodiments to couple a plurality of ring lasers together, each ring laser having an output beam that has a constant phase difference between the other lasers in the array.

More specifically, the Sziklas patent shows, in a first embodiment, reverse-to-forward wave coupling in which a portion of the reverse wave of one laser is injected (or coupled) into the forward wave of another laser. In a second embodiment, the patent shows forward-to-reverse wave coupling in which a portion of the forward wave of one laser is injected (or coupled) into the reverse wave of another laser.

In the reverse-to-forward wave coupling embodiment, a "forward wave suppressor" mirror is used to couple the forward wave into the reverse wave of the same laser by injecting a portion of the forward wave output beam of the laser into the reverse wave. Similarly, in the forward-to-reverse wave embodiment, a "reverse wave suppressor" mirror couples the reverse wave to the forward wave of the same laser.

Also, it is known that to provide a viable way of transmitting high-energy laser beams to a distant target, it is easier to propagate several smaller beams to the target than one large beam. This is especially true when the beams travel long distances through the atmosphere causing thermal blooming which limits the amount of power that can be carried in a single beam.

Typically, each output beam from the coupled lasers are fed to a focusing mechanism, e.g., a phased array telescope, to expand the laser beam, to allow focusing at long distances, and to point and focus the laser beam on the target. However, it is necessary for all the beams to be in phase at the target in order to deliver the maximum intensity (or irradiance).

If one of the focusing devices moves due to vibration, thermal, or other effects, the distance from the focusing device to the target changes. Furthermore, if the distance to the target changes by half a wavelength of the light transmitted, the phase of one beam relative to the others changes such that the interference pattern seen at the target changes from having one bright fringe in the middle of the pattern (when all beams are in phase) to having fringes not in the middle of the pattern. Consequently, the power is divided between these fringes, and thereby reduces the irradiance on the target.

To prevent this out-of-phase effect, if caused by focusing devices, requires adjusting the focusing devices which typically comprise large water-cooled mirrors designed for high-powered beams. Because of the large size of the mirrors, obtaining fine control is difficult.

Alternatively, if changes occur in the path length of the cavity of one of the ring lasers, e.g., due to vibration or other effects, the output beam from the laser with the cavity change may become out of phase with the other output beams. To prevent this out-of-phase condition, the large cavity mirrors must be adjusted and, due to the large size, fine control is again difficult to achieve.

Therefore, it is desirable to provide a coupled ring laser system that can alter the phase of the output beam of one laser without having to control large focusing means, without having to control large cavity mirrors, and without affecting the phase of the other lasers in the system.

DISCLOSURE OF INVENTION

Objects of the invention include provision of an output phase shifter for a plurality of coupled multiple-output ring lasers, which allows for easy phase adjustment of one output beam without affecting the phase of the other output beams, and without having to control large cavity mirrors or large focussing devices.

According to the present invention, a plurality of ring lasers are coupled together, each ring laser having a separate output beam, a self-coupling path to a suppressor mirror, and a mutual-coupling path between lasers. Phase shifting means are employed to change the optical path length to the suppressor mirror in one laser and to also change the optical path lengths of all mutual-coupling paths between the one laser and all other lasers in an equal and opposite direction, thereby changing the phase of the output beam of the one laser with respect to the others.

According further to the present invention, the lasers are coupled by a reverse-to-forward wave coupling scheme. According still further to the invention, the lasers are coupled by a forward-to-reverse wave coupling scheme.

The invention allows the changing of the phase of one output beam at the target without moving large telescope mirrors that are typically used to expand, point, and focus each laser beam onto the target or without moving large cavity mirrors. Furthermore, mutual-coupling beams between lasers and self-coupling beams to the suppressor mirrors are smaller and lower-powered beams, requiring smaller mirrors; thus these mirrors are easier to move and can be controlled with a higher bandwidth, i.e., a faster response time.

The foregoing and other objects, features and advantages of the present invention will become more apparent in light of the following detailed description of exemplary embodiments thereof as illustrated in the accompanying drawings.

BEST MODE FOR CARRYING OUT THE INVENTION

Figure 1:
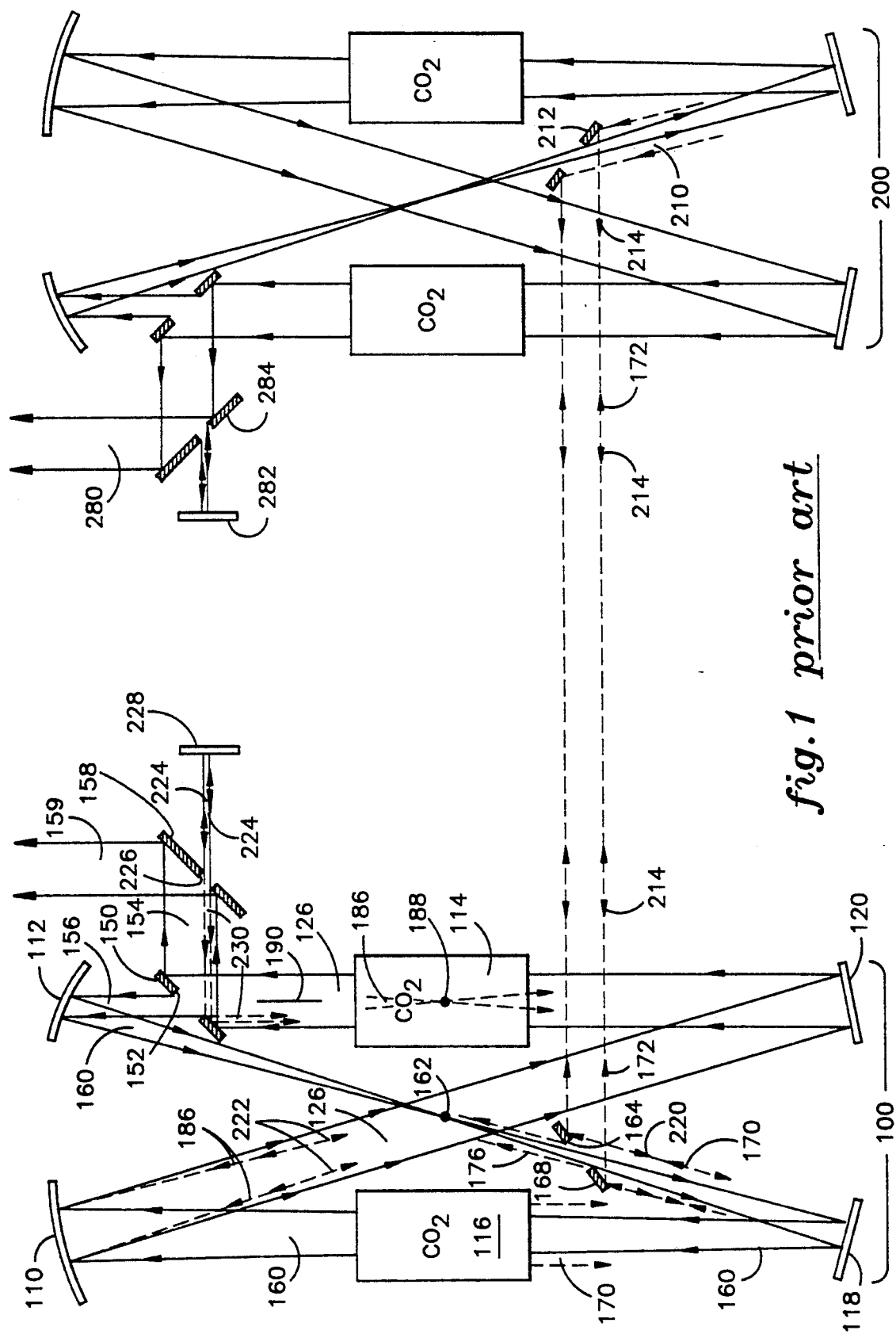
FIG. 1 is a diagram of a prior art coupled ring laser.

Referring to FIG. 1, two prior art mutually coupled ring lasers (resonators), 100,200 are shown, and the discussion that follows is similar to the laser configuration described in the aforementioned Sziklas patent.

The ring laser 100 comprises, inter alia, two concave main resonator mirrors 110,112, two gain mediums 114,116, and two flat turning mirrors 118,120 (also called resonator mirrors). It is known that each ring laser generates radiation (light waves) in two conventional modes, a forward mode (or wave) and a reverse mode (or wave).

The forward wave is indicated by a collimated beam 126 bounded by solid lines which is collimated between the main resonator mirrors 110,112. The collimated forward wave 126 propagates downwardly and to the right from the mirror 110 and is reflected upwardly off the flat mirror 120 through the gain medium 114, e.g., $CO_2$ laser mixture discharge, which amplifies the intensity of the light but does not alter its shape, as is known. The collimated forward wave 126 exits the gain medium 114 and propagates upwardly to a known scraper mirror 150 which deflects to the right a portion 154 of the outer area of the forward beam 126 and passes the remaining (inner) portion 156 of the beam 126 through an aperture 152 in the scraper mirror 150. The beam 154 is deflected upwardly by another scraper mirror 158 (described hereinafter) to provide a collimated output beam 159.

The collimated beam portion 156 of the collimated forward beam 126 travels upwardly to the concave mirror 112. The mirror 112 converts the collimated beam 156 to a focussed beam 160 which is directed downwardly and to the left. The numeral 160 will be used for the forward beam in both its converging and diverging forms. The beam 160 passes through a focal point 162 (or the forward wave focus) and diverges downwardly to the left. The divergent portion of the beam 162 passes through an aperture 164 of a scraper mirror 168 (discussed hereinafter), and is reflected upwardly off the flat turning mirror 118 through the second gain medium 116, similar to the first gain medium 114, which amplifies the intensity of the beam 160. The divergent beam 160 exits the gain medium 116 (still in divergent form) and is collimated by the concave mirror 110 where it begins another trip around the loop as the collimated beam 126. Hereinafter, when referring generally to the forward wave, the numeral 126 will be used to represent all portions 126,156,160, of the forward wave in the ring laser 100, unless otherwise specified.

As discussed hereinbefore, a ring laser propagates waves in both a forward and a reverse direction simultaneously. In the lower left of FIG. 1, two dashed arrows define the collimated portion of a reverse wave 170. For simplicity in the drawing, only portions of the reverse wave 170 are illustrated. The reverse beam 170 is reflected off the flat turning mirror 118 and travels upwardly and to the right to the scraper mirror 168 which deflects a portion 172 of the outer area of the reverse beam 170 to the right to other laser 200 (discussed hereinafter), and passes the remaining inner portion 176 of the reverse beam 170 through the aperture 164 in the scraper mirror 164.

The beam 176 travels upwardly and to the right to the concave mirror 112 which converts the collimated reverse wave 170 into a focussed reverse wave 186. The focussed reverse wave 186 travels downwardly, and converges through the aperture 152 of the mirror 150 to a focal point 188 (the reverse wave focus) on the right side of the ring laser 100. The focussed reverse wave 186 diverges below the focal point 188 and is reflected off the flat turning mirror 120 upwardly and to the left to the concave mirror 110. The concave mirror 110 converts the diverging reverse wave beam 186 to a collimated beam which passes downwardly along the left side of the ring laser 100 through the gain medium 114 and begins another trip around the ring as the collimated reverse wave beam 170. Hereinafter, when referring generally to the reverse wave, the numeral 186 will be used to represent all portions 186,170,176 of the reverse wave in the ring laser 100, unless otherwise specified.

The distance from the mirror 112 to the forward wave focus 162 is the same as the distance from the mirror 112 to the reverse wave focus 188; meaning that this configuration is a "symmetric" ring laser. Alternatively stated, the collimating length (the length of the collimated beam) is the same as the telescope length (the length of the focussed beam, i.e., the converging and diverging beams) of the laser. Using a "symmetric" ring laser is convenient because it allows the reverse wave to be collimated, thereby making the reverse wave easier to couple because: (1) no additional optical elements are needed to propagate the reverse wave to the other laser, and (2) it automatically mode matches (i.e., matches the phase curvature of the wave front) to the adjoint mode of the other laser(s) (discussed hereinafter). Also, the laser is "confocal", i.e., the focal point of each concave mirror is at the same location, which allows the output beam 159 of the laser 100 to be collimated, as is known.

Other resonator configurations may be used if desired. For example, if a non symmetric (or asymmetric) laser is used, the reverse wave is not collimated anywhere, so there is a greater possibility for geometrically large reverse waves (which may cause problems, as discussed below). In that case, more optical elements would be required to provide mode matching between the entering reverse wave and the resident adjoint forward wave of the laser. More specifically, if the reverse wave exiting one laser is diverging it must enter the other laser converging in order to be mode matched.

It is known in the ring resonator art to have a power imbalance between the forward and reverse modes of the laser. In the case of high power lasers, the geometric size and power of the reverse mode should be kept below a predetermined threshold to avoid damage to the system. For example, if a chemical gain medium is used and the reverse wave power is too high, the reverse wave may damage the chemical gain medium input nozzles. Also, one of the advantages of a ring laser over a linear laser is that a ring laser has a traveling wave whereas a linear laser has a standing wave which has a null at many points (e.g., at every wavelength) within the gain medium, which reduces the extraction efficiency. If the reverse wave is not reduced in power from the forward wave, there will be nulls in the ring laser due to interaction between the reverse wave and the forward wave, thereby reducing the extraction efficiency of the ring laser. Thus, in general, high reverse wave power increases the inefficiency in the system.

However, to allow for coupling, some reverse wave power must be present. The power of the reverse wave is set by the diameter of the apertures 152,164 of the scraper mirrors 150,168, respectively. More specifically, the aperture 164 is in the collimated portion of the reverse wave 170 and sets a limit to the diameter of the output beam 176.

If the directional arrows of the forward and reverse modes are reversed in FIG. 1, two oppositely propagating modes would be depicted. These modes demagnify in size, as is known, on each round-trip passage through the resonator (in contrast to the forward and reverse modes which are magnified on each round trip). That is, a wave propagates in the direction of the forward wave which is collimated where the forward wave is focussed and focussed where the forward wave is collimated (just like the reverse wave but in the opposite direction). This wave is called the "demagnifying forward wave" (or mode) or, using the terminology of the aforementioned Sziklas Patent, the "adjoint of the forward wave" (or mode). Similarly, a wave propogates in the direction of the reverse wave which is collimated where the reverse wave is focussed and focussed where the reverse wave is collimated (just like the forward wave but in the opposite direction). This wave is called the "demagnifying reverse wave" (or mode) or, using the terminology of the afornentioned Sziklas Patent, the "adjoint of the reverse wave" (or mode).

After a sufficient number of bounces, the demagnifying (adjoint) forward and reverse waves reduce to a line along the optical axis 190 (i.e., the center line between the resonator mirrors) of the ring laser 100. When diffraction (or diffractive expansion) is taken into account, these waves naturally excite the magnifying reverse and magnifying forward waves, respectively, as is also known (and discussed hereinafter). The ring laser 200 is a mirror-image of laser 100 and has a similar configuration thereto.

Coupling between lasers 100,200 is achieved by deflecting a portion 172 of the collimated reverse beam 170 by the scraper mirror 168 and directing it horizontally to the right, as indicated by the dashed lines 172. Symmetrically, in the laser 200, a portion 214 of a reverse beam 210 is deflected by a scraper mirror 212 and travels to the left along the same path as the beam 172. The input beam 214 from the laser 200 strikes the mirror 168 and is deflected downwardly and to the left as a collimated beam 220. The beam 220 has the same collimated and converging characteristics as the reverse wave 170 but is traveling in the direction of the forward wave 126. Thus, the beam 170 is the adjoint of the forward wave (or the demagnifying forward wave).

The path of the beam 220 is downwardly and to the left to the turning mirror 118 and upwardly along the left side of the laser 100, still collimated (like the reverse wave 170), to the mirror 110 from which it is focussed downwardly and to the right as shown by dashed lines 222. The focussed beam 222 is deflected by the turning mirror 120 toward the reverse wave focal point 188 on the right side of the laser 100. The focussed beam 222 travels through the aperture 152 of the scraper mirror 150, is collimated by the concave mirror 112, and passes through the aperture 164 of the mirror 168. The size difference between the collimated reverse wave 176 and the collimated reverse wave 170 shows the demagnification of the beam 220 that occurs on each round trip around the ring. The beam 220 (collimated portion), 222 (focussed portion) travels around the ring, becoming smaller with each pass and converging towards the optical axis 190 (as discussed hereinbefore).

At the same time, diffractive expansion of the converged adjoint beam 220,222 occurs, and it couples into the forward beam 126 (which is travelling in the same direction). More specifically, the converged beam 220,222 starts at the optical axis 190 and expands with the forward beam 126, controlling the phase of the forward beam 126 as it does so. It is through this phenomenon that the phase information is transferred from the laser 200 to the laser 100. Symmetrically, a similar transformation takes place from the laser 100 to the laser 200. The above coupling scheme is described in the aforementioned Sziklas patent in Col 3, lines 17–53 in similar fashion to that described above.

A portion 224 of the collimated beam 154 passes through an aperture 226 of the mirror 158 to a forward wave suppressor mirror 228. The beam 224 is deflected back along the direction from which it came and passes back through the aperture 226 as a collimated beam 230. The beam 230 is deflected off the scraper mirror 150 and propagates downwardly in the direction of the reverse beam 186 but is collimated where the reverse beam 186 is focussed; thus, it is a demagnifying reverse wave (or the adjoint of the reverse wave), and it is contracting toward the optical axis 190 (as discussed hereinbefore). The beam 230 passes around the ring being demagnified on each pass. As it contracts toward the optical axis 190, the same phenomenon of diffractive expansion occurs and the beam 230 couples into and controls the phase of the reverse beam 186.

Thus, the information from the laser 200 is coupled into the forward beam 126, and, through means of the forward wave suppressor mirror 228, energy is coupled into the reverse wave 186. Therefore, the coupling from the adjoint of the forward wave beam 220 to the reverse beam 186 is not direct. The reverse wave 186, now phase-locked to the forward beam 126, is coupled out by the scraper mirror 168 and back to the laser 200, thereby completing the loop and transmitting the phase information symmetrically and mutually between the two lasers 100,200.

Therefore, FIG. 1 illustrates adjoint reverse-to-forward coupling (shown in FIG. 1), i.e., injection of a portion of the reverse mode from one ring laser into the adjoint of the forward wave (or demagnifying forward wave) of another ring laser.

If the forward wave suppressor mirror 228 was not present, the system would not exhibit stable phase-locked operation because the mirror 228 injects a portion of the forward mode into the reverse mode so as to provide adequate energy for coupling.

As discussed hereinbefore, and in the aforementioned Sziklas patent, the reverse wave power must be limited to avoid system damage, but there must also be some reverse wave geometric size and power present to provide the coupling. The ratio of energy between forward and reverse modes is governed by the ratio of the degree of coupling provided by the scraper mirrors 168,158 and that by the selection of aperture 164,226 sizes in these mirrors 168,158, one can select an energy ratio which gives a broad locking range without adversely affecting individual ring laser performance. The reverse-to-forward power ratio used was one-to-four, however other ratios may be used if desired.

In the aforementioned Szilkas patent, one mirror (215; FIG. 1; Sziklas) in the laser 200 (FIG. 1; Sziklas) is shown to be adjustable (Col 3, lines 8-16). This adjustment is provided to make the two lasers in the system phase-locked, i.e., make the phase shift between output beams constant (not changing with time). To achieve and maintain phaselock, the cavity length of each laser must be kept to an integer multiple of optical wavelengths of each other $+/-$ $\lambda/4$ to $\lambda/10$ (depending on the robustness of the system). If the lasers in the system were not coupled at all, the two lasers would independently run at slightly different frequencies, e.g., a difference of 1 MHz to 3 MHz, thereby exhibiting a phase relationship between the laser output beams that changes with time.

Because there is a cavity length range over which the lasers will exhibit phase-lock, the phase of the output beams may not be in phase even though the system has a constant phase shift. Also, one mirror may exhibit some jitter, not enough to make the lasers come out of phase-lock, but enough to generate phase jitter on the output beams. Alternatively, the laser output beams may all be in phase when they leave the laser system but the beams may be sent to focussing means, each of which vary slightly with time.

Figure 2:
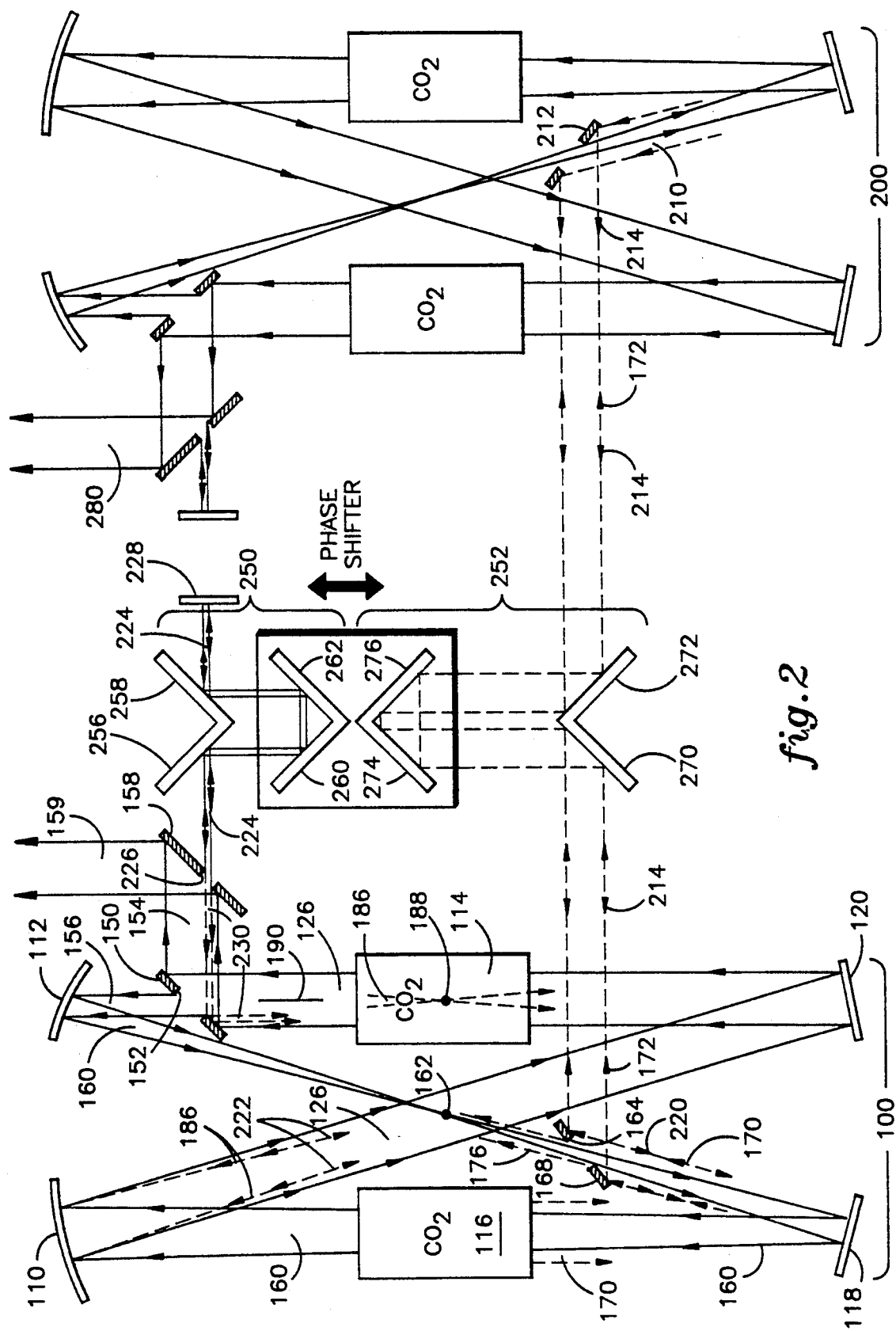
FIG. 2 is a diagram of two reverse-to-forward wave coupled ring lasers with phase shifting means in one of the lasers, in accordance with the present invention.

Referring now to FIG. 2, the invention comprises a first optical trombone 250 disposed in the path of the beam 224 between the output scraper mirror 140 and the forward wave suppressor mirror 228 (or the self-coupling path or the forward-to-reverse wave path). Also, a second optical trombone 252 is disposed in the path of the bi-directional coupling beams 172,214 between the scaper mirrors 168,212 (or the mutual-coupling path).

An optical trombone, as is known, is a device that alters the path length of a beam without changing its ultimate direction of propagation. It leaves the mode, power, and coherence, unchanged, but does change the phase of the beam. More specifically, the optical trombone 250 comprises a pair of mirrors 256,258 mounted perpendicular to each other, and another pair of mirrors 260,262 mounted perpendicular to each other. The mirror 256 is disposed parallel to the mirror 260 and the mirror 258 is disposed parallel to the mirror 262. The mirror 256 diverts the beam 224 to the mirror 260 which diverts the beam 224 to the mirror 262 which diverts the beam 224 to the mirror 258 which diverts the beam 224 to the forward wave supressor mirror 228. A similar propogation pattern occurs in the opposite direction for the beam 224 travelling away from the forward wave supressor mirror 228. Also, the pair of mirrors 260,262 is disposed on a moving table 268 or translation stage, which moves in a direction perpendicular to the propagation of the beam 224 before entering the trombone 250.

A simliar configuration exists for the second trombone 252 whereby a first pair of mirrors 270,272 are mounted perpendicular to each other, and a second pair of mirrors 274,276 are mounted perpendicular to each other. The mirror 270 is disposed parallel to the mirror 274 and the mirror 272 is disposed parallel to the mirror 276. The mirror 270 diverts the beam 172 to the mirror 274 which diverts the beam 172 to the mirror 276 which diverts the beam 172 to the mirror 272 which diverts the beam 172 to the laser 200. A similar propogation pattern occurs in the opposite direction for the beam 214 from the laser 200 to the laser 100. Also, the mirrors 274,276 are disposed on the table 268 which moves in a direction perpendicular to the propagation of the beams 172,214 before entering the trombone 252. Thus, the movable parts of each trombone 250,252 are disposed on the common moving table 268 (or translation stage).

The table 268 produces a path length change and a corresponding phase shift in each beam that it intercepts. Thus, the table 268 is referred to herein as a phase shifter 268.

When the phase shifter 268 is moved in the up direction the path length from the scraper mirror 150 to the forward wave suppressor mirror 228 (i.e., the forward-to-reverse wave self-coupling path length) decreases and the path length from the scrapper mirror 168 to the mirror 212 of the laser 200 (i.e., the reverse-to-forward wave mutual-coupling output path length) increases by the same amount. This has the effect of changing the phase of the output beam 159 of the laser 100 without affecting the phase of the output beam 280 of the laser 200. Similarly, when the phase shifter 268 is moved down, the self-coupling path length is increased and the mutual-coupling path length is decreased by the same amount.

More specifically, suppose that an additional length $\Delta L$ is added to the reverse-to-forward wave mutual-coupling path by the trombone 252 and the same length $\Delta L$ is subtracted from the forward-to-reverse self-coupling path by the trombone 250. This results in a phase change of $\Delta\phi = (2\pi/\lambda)\Delta L$, where $\lambda$ is the wavelength of the laser light, being added to the reverse-to-forward wave coupling beam 214 arriving at the scraper mirror 168 from the laser 200 (due to the trombone 252). For illustrative purposes, the phase of the beam 214 at the scraper mirror 212 is assumed to be unchanged throughout this analysis. To compensate for the phase change in the beam 214 entering the mirror 168 caused by the trombone 250, the phase of the forward wave 126 will advance by $+\Delta\phi$, by the phenomenon discussed hereinbefore, thereby advancing the phase of the output beam 159 of the laser 100 by $+\Delta\phi$.

Advancing the phase of the forward wave by $+\Delta\phi$ also advances the phase of the coupling beam 224, (originating at the aperture 226 of the mirror 158), by $+\Delta\phi$. However, the length of the self-coupling path between the mirror 158 and the forward wave suppressor mirror 228 is decreased by trombone 250 by the amount $\Delta L$, thereby decreasing the phase of the beam 224, by $2\Delta\phi$ (because the wave 224 travels through the optical trombone 250 twice), to a value of $-\Delta\phi$ (i.e., $\Delta\phi - 2\Delta\phi = -\Delta\phi$) for the adjoint of the reverse wave 230. Because the adjoint of the reverse wave 230 controls the phase of the reverse wave (as discussed hereinbefore), the phase of the reverse wave in the laser 100 is retarded by $-\Delta\phi$. Therefore, the reverse wave output coupling beam 172, when leaving the scaper mirror 168, has a net phase change of $-\Delta\phi$. However, the length of the mutual-coupling path has been increased by $\Delta L$ by the trombone 252, thereby shifting the beam 172 by $+\Delta\phi$ (to the right of the trombone 252), to give a net phase change of zero for the coupling beam 172 incident on the scraper mirror 212 from the laser 100. Thus, there is zero phase difference between the coupling beam 214 at the scraper mirror 212 and the coupling beam 172 at the scraper mirror 212.

Consequently, the forward wave of the two lasers 100,200, will be $\Delta\phi$ out of phase from each other, and reverse waves of the two lasers 100,200 will be $-\Delta\phi$ out of phase. Also, the phase of the output beam 280 of laser 200 is unaffected by this phase change because the phase of the beam 172 entering the laser 200 is identical to what it was before the phase shifter 268 moved. Further, if conditions for phase locking are initially satisfied, phase locking is not disturbed by moving the phase shifter because there is no change in the cavity length and there is no phase change seen by the laser 200 at the scraper mirror 212.

Figure 3:
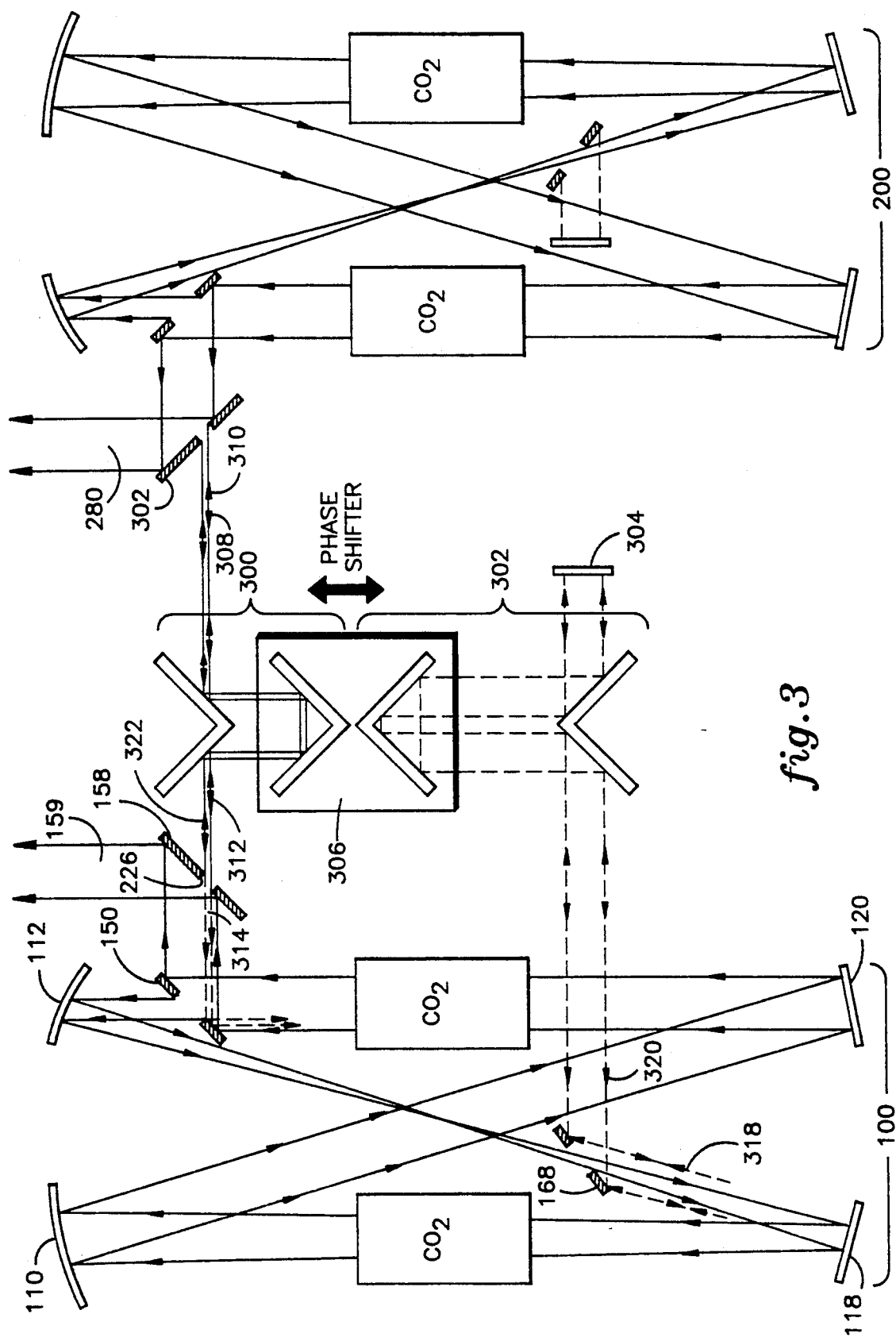
FIG. 3 is a diagram of two forward-to-reverse wave coupled ring lasers with phase shifting means in one of the lasers, in accordance with the present invention.

Referring to FIG. 3, a similar configuration to FIG. 2 is applied to forward-to-reverse coupled ring lasers, like that described in FIG. 2 of the aforementioned Sziklas patent.

A mutual-coupling path exists between the scraper mirror 158 and a scraper mirror 302, which couples the forward wave from one laser to the adjoint of the reverse wave of the other laser. The adjoint of the reverse wave controls the phase of the reverse wave (as discussed hereinbefore). The reverse wave is deflected off the scraper mirror 168 to a reverse-wave suppressor mirror 304 which deflects the reverse wave and reinjects it back into the adjoint of the forward wave, which controls the phase of the forward wave, thereby achieving phase-lock between the lasers.

A first optical trombone 300 is disposed in the mutual-coupling path between the mirrors 158 and 302, and a second optical trombone 302 is disposed in the self-coupling path between the mirrors 168 and 304. Both trombones 300,302 are mounted to a common phase shifter 306, similar to the reverse-to-forward coupling scheme of FIG. 2 herein, and the same phase shifting effect occurs. The phase shift between the coupling beam 308 exiting the mirror 302 and the coupling beam 310 entering the mirror 302 is zero, but the phase of the output beam 159 of the laser 100 shifts as a function of the position of the phase shifter 306.

More specifically, if the phase shifter 306 moves down to add a distance $\Delta L$ to the mutual-coupling path length, it introduces a phase shift $+\Delta\phi$, to the beam 312 to the left of the trombone 300 which passes through the aperture 226 becoming the beam 314. The beam 314 is deflected downwardly by the mirror 150 and becomes the adjoint of the reverse wave. Because the adjoint of the reverse wave controls the phase of a reverse wave 318, the reverse wave 318 has a phase shift $+\Delta\phi$.

After traveling around the ring laser 100 reflecting off the mirrors 120,110,118, as described hereinbefore, the reverse wave 318 is deflected off the scraper mirror 168 and horizontally to the right where it passes through the trombone 302 and reflects off the reverse wave suppressor mirror and then through the trombone 302 again. Because the trombone 302 is slid down to decrease the self-coupling path length by $\Delta L$, it introduces a phase change of $-2\Delta\phi$. Thus, the wave 320 returning from the trombone 302 has a phase of $-\Delta\phi$ (i.e., $+\Delta\phi - 2\Delta\phi = -\Delta\phi$. The wave 320 is reinjected into the laser 100 by the mirror 168 as the adjoint of the forward wave, which controls the phase of the reverse wave. Thus, the output coupling wave 322 has a phase of $-\Delta\phi$ which after passing through the trombone 300 is increase by $+\Delta\phi$ to a net phase change of zero at the mirror 302 of the laser 200.

Thus, for either reverse-to-forward coupling (FIG. 2) or forward-to-reverse coupling (FIG. 3) schemes, to change the phase of a given laser output without changing the phase of any other laser output, the optical path length to the suppressor mirror of that laser is changed and the optical path lengths of all coupling paths to that laser are also changed in an equal and opposite direction. An alternative view is that the suppressor mirror and the laser cavity are part of an overall coupling path, and changing the lengths of the system, in the manner described herein, simply changes the position of the laser in the overall coupling path.

Although the invention has been described as having two gain mediums for each ring laser, it should be understood by those skilled in the art that only one gain medium may be used, provided there is enough gain to overcome the loss due to extraction of the output beam. Similarly, the invention may employ more than two gain mediums.

Instead of using optical trombones to vary the optical path lengths in the system, if the coupling beams are of sufficiently low power, the path lengths may be varied electro-optically without moving any mirrors at all. For example, a known electro-optic modulator has an electro-optic material with a voltage applied thereacross and the input light beam is incident on and propogates through the material, such that the light propogates perpendicular to the electric field induced by the applied voltage. As the voltage changes, the index of refraction (n) of the material changes, which has the effect of changing the optical path length, as is known.

Also, although the invention has been described as coupling only two ring lasers, it should be understood by those skilled in the art that the invention may easily be expanded to work with a large number N of ring lasers. In that case, the number of phase shifters needed would be N-1 to allow the phase of the output beam of each laser to be adjusted independently of the other beams. Also, when coupling more than three lasers, the invention will work with "series" coupling (i.e., only coupling to an adjacent laser) or "tight" coupling (i.e., coupling to every other laser in the system) or "intermediate" coupling (i.e., a level of coupling in between series and intermediate). Thus, it should be understood that the laser 200 does not have a phase shifter between its suppressor mirror 282 and its scaper mirror 284, because there are only two lasers in FIG. 2.

One way to interface with more than two lasers is to tap-off the mutual coupling path where zero phase shift occurs between entering and leaving waves, e.g., near scraper mirror 212 (FIG. 2), or near scraper mirror 302 (FIG. 3). This allows only one phase shifter to be used to adjust one output beam in a system having N lasers. However, N-1 phase shifters are still needed if all N output beams of N lasers are to be adjustable independently.

Even though the invention has been described as using an unstable resonator, it should be understood that the invention may be used with a stable resonator. In that case, instead of using scraper mirrors, one would use beamsplitters (i.e., partially reflecting mirrors). Also, instead of hole scraper mirrors, straight-edged scraper mirrors may be used, provided the light is rotated 90 degrees, as in a UR90 resonator, as is known in the art.

Instead of using two concave mirrors, it should be understood by those skilled in the laser design art that convex mirrors may alternatively be used for one or all of the mirrors.

Although the invention has been described and illustrated with respect to the exemplary embodiments thereof, it should be understood by those skilled in the art that the foregoing and various other changes, omissions and additions may be made without departing from the spirit and scope of the invention.

I claim:

1. A phase shifter for coupled multiple output ring lasers, comprising:
   a first ring laser having at least one gain medium capable of amplifying light, having a plurality of resonator mirrors arranged in a ring configuration, having a forward and a reverse mode propagating therein, having a self-coupling path to a suppressor mirror for re-injecting a wave of said first laser back into said first laser, and having a first laser output beam;
   a second ring laser having at least one gain medium capable of amplifying light, having a plurality of resonator mirrors arranged in a ring configuration, having a forward and a reverse mode propagating therein, having a self-coupling path to a suppressor mirror for re-injecting a wave of said second laser back into said second laser, and having a second laser output beam;
   said first and second lasers being coupled together by a common bi-directional mutual-coupling path therebetween, which passes phase information between said first laser and said second laser; and
   phase shifting means, for altering the path length of said self-coupling path by a predetermined amount and for altering the path length of said mutual-coupling path by said predetermined amount in an opposite direction from said altering of the path length of said self-coupling path, thereby changing the phase of said first laser output beam with respect to said second laser output beam.

2. The phase shifter of claim 1 wherein said phase shifting means comprises:
   a first optical trombone, disposed in said self-coupling path to said suppressor mirror, having a stationary portion and a movable portion, for changing the path length of said self-coupling path;
   a second trombone, disposed in said mutual-coupling path between said first and second lasers, having a stationary portion and a movable portion, for changing the path length of said mutual-coupling path; and
   said movable portion of said first trombone and said movable portion of said second trombone being disposed on a common movable stage.

3. The phase shifter of claim 1 wherein said suppressor mirror is a forward wave suppressor mirror which re-injects said forward mode into an adjoint of the reverse mode of the corresponding laser.

4. The phase shifter of claim 1 wherein said mutual-coupling path couples said reverse mode of said first laser to said forward mode of said second laser and couples said reverse mode of said second laser to said forward mode of said first laser.

5. The phase shifter of claim 1 wherein said suppressor mirror is a reverse wave suppressor mirror which re-injects said reverse mode of a corresponding laser into an adjoint of the forward mode of the corresponding laser.

6. The phase shifter of claim 1 wherein said mutual-coupling path couples said forward mode of said first laser to said reverse mode of said second laser and couples said forward mode of said second laser to said reverse mode of said first laser.

7. A phase shifter for coupled multiple output ring lasers, comprising:
   a plurality of ring lasers each having at least one gain medium capable of amplifying light, each having a plurality of resonator mirrors arranged in a ring configuration, each having a forward and a reverse mode propagating therein, each having a self-coupling path to a suppressor mirror for re-injecting a wave of one of said lasers back into said one of said lasers, and each having a laser output beam;
   said lasers being coupled together by bi-directional mutual-coupling paths therebetween, which passes phase information between said lasers; and
   phase shifting means, for altering the path length of said self coupling path of one of said lasers by a predetermined amount and for altering the path length of all of said mutual-coupling paths between said one of said lasers and all other lasers by said predetermined amount in an opposite direction from said altering of the path length of said self-coupling path, thereby changing the phase of said one of said lasers output beam with respect to all other laser output beams.

8. The phase shifter of claim 7 wherein said phase shifting means comprises:
   a first optical trombone, disposed in said self-coupling path to said suppressor mirror, having a stationary portion and a movable portion, for changing the path length of said self-coupling path;
   a second trombone, disposed in each of said mutual-coupling paths between said lasers, having a stationary portion and a movable portion, for changing the path lengths of each of said mutual-coupling paths; and
   said movable portion of said first trombone and said movable portion of said second trombone being disposed on a common movable stage.

9. The phase shifter of claim 7 wherein said suppressor mirror is a forward wave suppressor mirror which re-injects said forward mode of a corresponding laser into an adjoint of the reverse mode of the corresponding laser.

10. The phase shifter of claim 7 wherein said mutual-coupling paths provide reverse-to-forward wave coupling between said lasers.

11. The phase shifter of claim 7 wherein said suppressor mirror is a reverse wave suppressor mirror which re-injects said reverse mode of a corresponding laser into an adjoint of the forward mode of the corresponding laser.

12. The phase shifter of claim 7 wherein said mutual-coupling paths provide forward-to-reverse wave coupling between said lasers.

* * * * *